(12) United States Patent
Hartless

(10) Patent No.: US 8,503,587 B2
(45) Date of Patent: Aug. 6, 2013

(54) ADAPTIVE CHANNEL TRACKING USING PEAK FADE DEPTH ESTIMATION OVER A SLOT

(75) Inventor: Mac L. Hartless, Forest, VA (US)

(73) Assignee: Harris Corporation, Melbourne, FL (US)

(*) Notice: Subject to any disclaimer, the term of this patent is extended or adjusted under 35 U.S.C. 154(b) by 165 days.

(21) Appl. No.: 13/113,445

(22) Filed: May 23, 2011

(65) Prior Publication Data

US 2012/0300821 A1    Nov. 29, 2012

(51) Int. Cl.
*H03D 1/00*    (2006.01)

(52) U.S. Cl.
USPC .......................................... 375/343; 375/350

(58) Field of Classification Search
USPC .................. 375/343, 347, 349, 326, 327, 350
See application file for complete search history.

(56) References Cited

U.S. PATENT DOCUMENTS

| | | | |
|---|---|---|---|
| 5,111,481 A | 5/1992 | Chen et al. | |
| 5,285,480 A | 2/1994 | Chennakeshu et al. | |
| 5,680,419 A | 10/1997 | Bottomley | |
| 6,081,566 A * | 6/2000 | Molnar et al. | 375/347 |
| 6,151,484 A | 11/2000 | Ramesh | |
| 6,173,014 B1 * | 1/2001 | Forssen et al. | 375/267 |
| 6,389,295 B1 | 5/2002 | Ramesh | |
| 6,411,649 B1 | 6/2002 | Arslan et al. | |
| 6,507,602 B1 * | 1/2003 | Dent | 375/142 |
| 6,768,913 B1 * | 7/2004 | Molnar et al. | 455/562.1 |

(Continued)

FOREIGN PATENT DOCUMENTS

WO    01/99329 A1    12/2001

OTHER PUBLICATIONS

Bowyer, D.E., et al., "Adaptive Clutter Filtering Using Autogressive Spectral Estimation", IEEE Transactions on Aerospace and Electronic Systems, IEEE Service Center, Piscataway, NJ, US, vol. AES-10, No. 4, Jul. 1, 1979, pp. 538-546.

(Continued)

*Primary Examiner* — Emmanuel Bayard
(74) *Attorney, Agent, or Firm* — Fox Rothschild, LLP; Robert J. Sacco

(57) ABSTRACT

Peak fade depth is measured (202) over a period of time, and a bandwidth of a channel filter (104) is then determined (206) according to the measured peak fade depth (202). In preferred embodiments the average peak fade depth over two or more time slots is used. In a specific embodiment, an $\alpha$ filter (206) is used to determine the bandwidth of the matched filter (104), in which $\alpha$ is determined based upon the measured peak fade depth (204). In various embodiments, peak fade depth is correlated to the Doppler shifting of the channel, which in turn is used to determine the bandwidth of the matched filter by way of the $\alpha$ parameter. Hence, a non-linear equation can be used to determine the value of $\alpha$ which yields a minimum bit error rate for the matched filter (104). More specifically, a matched filter (104) is matched to a received signal r(t) having k states according to a plurality of matched filters $M_k$ and outputs a signal given by $|r(t)-C_k(t)*M_k(t)|^2$, in which $C_k(t)$ is a channel estimate provide by a channel tracker (106) for a state k at time period t that is given by $C_k(t)=\alpha*c_k(t)+(1-\alpha)*C_k(t-1)$, $c_k(t)=M_k*r(t)/(M_k*conj(M_k))$, and $conj(M_k)$ is the complex conjugate of $M_k$. For each time slot, $\alpha$ is computed from the running average of the peak fade depth (202) according to a predetermined equation (204).

14 Claims, 3 Drawing Sheets

(56) References Cited

U.S. PATENT DOCUMENTS

| | | | |
|---|---|---|---|
| 6,970,415 B1 | 11/2005 | Galarza et al. | |
| 7,349,469 B1* | 3/2008 | Touzni et al. | 375/232 |
| 7,418,035 B1* | 8/2008 | Clark | 375/233 |
| 7,764,753 B2 | 7/2010 | Cheng et al. | |
| 2003/0058962 A1* | 3/2003 | Baldwin | 375/316 |
| 2004/0052306 A1* | 3/2004 | Ibrahim et al. | 375/152 |
| 2004/0248515 A1* | 12/2004 | Molev Shteiman | 455/63.1 |
| 2011/0267938 A1* | 11/2011 | Conrad et al. | 370/216 |
| 2012/0300659 A1* | 11/2012 | Heidari et al. | 370/252 |

OTHER PUBLICATIONS

Kaya, I., et al., "Application of Channel Matched Filters and Direct Coefficients Calculation for Low Complexity High Bit Rate Equalisation", Jan. 1, 1996, pp. 7/1-7/1, The Institute of Electrical Engineers. Printed and published by the IEE, Savoy Place, London WC2R 0BL UK.

International Search Report mailed Jul. 12, 2012; Application Serial No. PCT/US2012/037754, in the name of Harris Corporation.

* cited by examiner

ADAPTIVE CHANNEL TRACKING USING PEAK FADE DEPTH ESTIMATION OVER A SLOT

BACKGROUND OF THE INVENTION

1. Statement of the Technical Field

The inventive arrangements relate to coherent demodulators, and more particularly to coherent demodulators that use adaptive channel trackers

2. Description of the Related Art

In digital data communication systems, transmit symbols must be reconstructed from a received sequence of transmitted symbols. A common difficulty which must be overcome in such systems is the problem of inter-symbol interference (ISI), as is frequently caused by multi-path propagation. It is well known that ISI can be reduced by lowering the symbol transmission rate. However, this leads to lower efficiency and can be avoided by using an equalizer or a maximum likelihood Viterbi algorithm which effectively compensate for the ISI problem. The equalizer effectively inverts the effects of the channel by functioning as a system in series with the channel.

In order to function effectively, an equalizer must have some knowledge of the channel. However, real mobile radio channels are constantly changing and therefore the equalizer must be constantly updated with new information about the current state of the channel. This function is performed by a channel tracker (sometimes referred to as a channel estimator) which implements a channel tracking algorithm. The combination of the equalizer and the channel tracker is sometimes referred to as an adaptive equalizer.

The optimum bandwidth to be used for a filter which is matched to the modulation scheme will vary depending on the Doppler shift associated with a received sequence of transmitted symbols. Doppler shift is the frequency shift experienced by a radio signal when a wireless receiver and/or transmitter is in motion. Doppler shift can result in Doppler spread in the frequency domain. Accordingly, the adaptation time of processes which are used by channel trackers are preferably faster than the rate of change of the channel. Current methods used for adaptive channel tracking are processing intensive and include Kalman filters, pilot sequences and/or multiple filter banks. Accordingly, it would be desirable to provide adaptive channel tracking that is quick, simple and effective.

SUMMARY OF THE INVENTION

Embodiments of the invention concern adaptive channel tracking, and in particular involve determining an optimal bandwidth for a channel tracking filter. A peak fade depth is measured over a period of time, and a bandwidth of a channel tracking filter is then determined according to the measured peak fade depth. The average peak fade depth over two or more time slots is advantageously used for purposes of determining bandwidth. In a specific embodiment, an $\alpha$ filter is used to determine the bandwidth of the channel tracking filter, in which $\alpha$ is determined based upon the measured peak fade depth. In various embodiments, peak fade depth is highly correlated to the Doppler shift of the channel, which in turn is used to determine the bandwidth of the channel tracking filter by way of the $\alpha$ parameter. Hence, a non-linear equation can be used to determine the value of $\alpha$ which yields a minimum bit error rate for the demodulation process. In a preferred embodiment the matched filter unit is matched to a received signal $r(t)$ having k states according to a plurality of matched filters $M_k$ and outputs a signal given by $|r(t)-C_k(t)*M_k(t)|^2$.

An adaptive channel tracker provides $C_k(t)$ that is a filtered channel estimate for a state k at time period t that is given by $C_k(t)=\alpha*c_k(t)+(1-\alpha)*C_k(t-1)$, where the instantaneous estimate of the channel at time t is given by $c_k(t)=M_k*r(t)/(M_k*conj(M_k))$, and $conj(M_k)$ is the complex conjugate of $M_k$. For each time slot, $\alpha$ is computed from the running average of the peak fade depth according to a predetermined equation.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
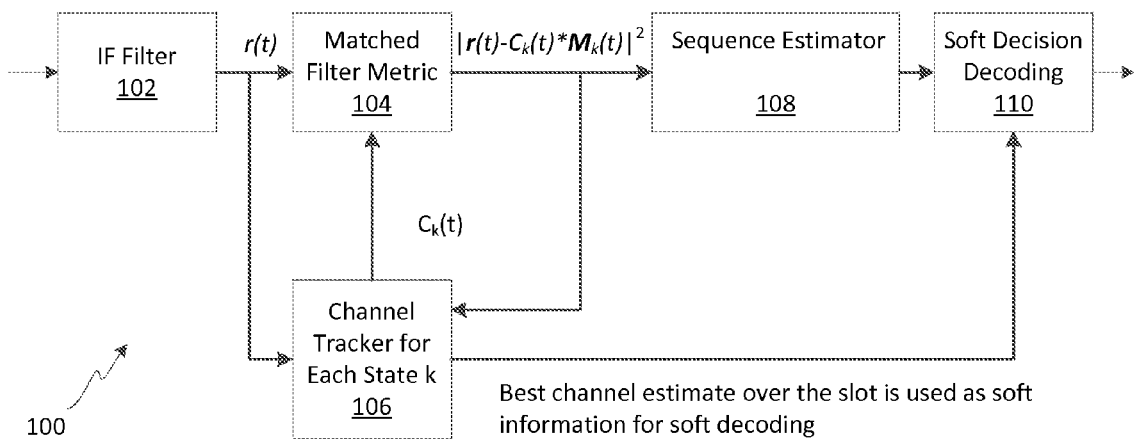
FIG. 1 is a block diagram of a coherent demodulator in which an adaptive channel tracker would be used.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Coherent demodulators for communication systems need to adapt to channel conditions for optimum performance. The optimum bandwidth as determined by a channel tracker varies depending on the Doppler frequency shift of received signals, and hence Doppler tracking can be important for such receivers. However, the Doppler shift is not known in advance, which makes it difficult to know what is the optimum bandwidth that should be used for the channel tracker. It has been determined, however, that the peak fade depth of a received signal varies as a function of the Doppler shift for that signal. Accordingly, one embodiment of the present invention provides a simple method for estimating Doppler shift by using the measured peak fade depth of a signal. The estimate of the Doppler shift is thereafter used as a basis to change the receiver bandwidth. The method is facilitated by use of a simple adaptive filter, and in particular an $\alpha$ filter for the channel tracker. Using such an $\alpha$ filter, the bandwidth is adjusted in accordance with the parameter $\alpha$. The method, which is described below, will be more clearly understood as the discussion progresses.

Briefly, there is a relationship between peak fade depth of a signal and the Doppler frequency shift of that signal, which relationship can be determined from computer simulation, empirical data or combinations of the two. Once the relationship is known, then it is possible to estimate a Doppler frequency shift based on information concerning measured peak fade depth during some time-period, such as the channel slot time period. For each Doppler frequency shift, there is an optimal matched filter bandwidth that can be used to minimize a bit error rate (BER) when demodulating that signal. Hence, the optimal matched filter bandwidth may be set as a function of the measured peak fade depth. However, it is typically better to use a filter to estimate the optimal band width rather than relying on an instantaneous measurement of the peak fade depth, particularly, for example, if the channel is not fast changing. A preferred embodiment uses an α filter as such filters are computationally easy to implement, although any suitable filter or related algorithm may be used to convert peak fade depth into bandwidth. With regards to an α filter, one can use simulation, empirical data or a combination of the two to estimate an optimal α to use as a function of the Doppler shift in the received signal to provide the lowest BER. Filter bandwidth is then related to the value of α, and α is related to the instantaneous peak fade depth. This process is discussed in greater detail in the following.

Doppler shifts occur in the frequency of a transmitted signal due to motion of a transmitter and/or a receiver. The actual amount of shift will vary depending on the frequency of the signal and the relative velocity of the receiver and transmitter. The Doppler shift will typically result in the frequency of a signal varying over time between a maximum and a minimum value which are determined by the amount of Doppler shift that has occurred. The Doppler shift will result in spectral broadening of the received signal, which will in turn cause signal fading. Peak fade depth is a measure of the ratio between a maximum signal power and a minimum signal power, measured during some period of time, where the difference in power is caused by signal fading.

An α filter, as referenced herein is a simple filter having a single tap, in which the output is the function of the input and of the immediately previous output. That is, an α filter has the form: $X(t)=\alpha^*x(t)+\beta^*X(t-1)$, in which the values of α and β are either constants or are computed by other means with each iteration t. For the simplest case, one can set $\beta=(1-\alpha)$, and hence the α filter has the form: $X(t)=\alpha^*x(t)+(1-\alpha)^*X(t-1)$. Although α filters are used in the following, it will be appreciated that other types of filters, or even no filter at all, need be used. For example, more computationally intensive filters that have greater numbers of taps can also be used.

Referring now to FIG. 1, there is shown a block diagram of an embodiment coherent demodulator system 100. RF signals from an antenna are processed by a receiver (not shown) and converted to an intermediate frequency (IF), as known in the art. The IF signals are processed in an optional IF filter 102 to remove extraneous signals and noise, as known in the art. Generally, the IF filter 102 is tuned to the bandwidth of the transmitted signal so as to eliminate extraneous noise. The output of the IF filter 102 is a signal r(t) which is intended for demodulation. In an embodiment of the invention, the coherent demodulator system 100 includes a matched filter 104, a channel tracker 106, a maximum likelihood sequence estimator 108, and a soft decision decoding block 110.

As shown in FIG. 1, the output r(t) of the IF filter 102 is communicated to a matched filter 104 and a channel tracker 106. Generally, for each symbol time t and state k the signal r(t) is compared to matched filter $M_k(t)$ which is matched to the encoding method employed by the transmitter of the signal r(t) and modified in accordance with the best channel estimate $C_k(t)$ for that time t and state k. The modified filter can be expressed as $C_k(t)^*M_k(t)$. The best channel estimate $C_k(t)$ is generated by the channel estimator 106, such that the modified filter will generate a scalar filtered signal with an increased signal-to-noise ratio (SNR) relative to the original received signal r(t). That is, the output of the matched filter 104 is given as $|r(t)-C_k-(t)^*M_k(t)|^2$. This filtered scalar signal which represents a difference between what was received and what is the estimate of the transmitted signal at time t and in state k, is then used by the maximum likelihood sequence estimator 108 for demodulation of the transmitted symbol information by finding the path (the specific state k at time t) through the trellis which minimizes the total measured difference over a slot.

The channel tracker 106 generates the channel estimate $C_k(t)$ for a data slot t and state k that is used by the matched filter 104. Hence, for each slot t, the channel tracker 106 generates k channel estimates and it is therefore desirable that the complexity of the channel tracker 106 be minimized so as to reduce computational loading. By employing peak fade depth to estimate the value of α in a simple α filter, the channel tracker 106 meets this criteria.

Because the channel tracker 106 employs an α filter, it is recursive in nature. That is, for each slot t, the channel estimate $C_k(t)$ is a function of a current value of α, which itself is a function of the peak fade depth for the slot t, and of the previous channel estimate $C_k(t-1)$ for the immediately prior slot (t-1). On startup, i.e., when t=1, the value for $C_k(0)$ can be set to the instantaneous value of $C_k(1)$. Thereafter, the best channel estimate $C_k(t)$ over a slot of data t and state k is given by:

$$C_k(t)=\alpha^*c_k(t)+(1-\alpha)^*C_k(t-1), \quad (\text{Eqn. 1})$$

in which:

$$c_k(t)=M_k^*r(t)/(M_k^*\text{conj}(M_k)), \quad (\text{Eqn. 2})$$

where $M_k$, a vector value, is the matched filter for the state k, and $\text{conj}(M_k)$ is the complex conjugate of $M_k$. This scalar value $C_k(t)$ of Eqn. 1, which may be thought of as a weighted time average of the instantaneous channel estimate $c_k(t)$ of Eqn. 2, is then forwarded on to the matched filter 104 for processing of the input signal r(t), as discussed above.

Figure 2:
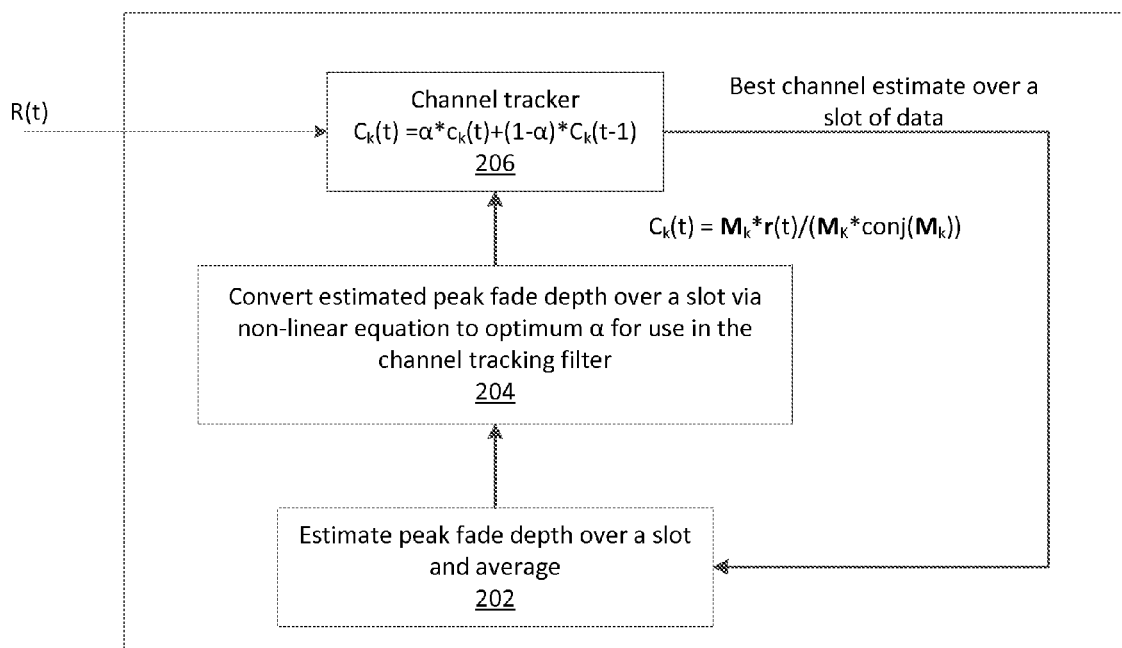
FIG. 2 is a flow chart which is useful for understanding the processing performed by the adaptive channel tracker in FIG. 1.

With respect to the calculation of α for each slot iteration t of the channel tracker 106, reference is drawn to FIG. 2. To predict the current value of α for the current slot t, the channel tracker 106, in a first step 202, estimates the peak fade depth over the slot t and then filters this value by way of averaging. For example, a running average of the peak fade depth can be employed using, again, a simple α filter, in which α is a constant, for example. Of course, as above, other types of filters can be used, or even no filter at all (i.e., the instantaneous peak fade depth can be used instead). In a second step 204, the channel tracker 106 uses this averaged (filtered) peak fade depth for the current slot t to determine the current optimum value of α. This can be done, for example, by way of processing circuitry that employs a mathematical function that uses peak fade depth as an input to output a corresponding value for α, employs a look-up table that indexes based upon peak fade depth to provide a corresponding α, or employs combinations thereof. Any suitable processing circuitry may be used to perform this conversion operation, such as a digital signal processor or the like. Methods for finding functions that convert peak fade depth (filtered or otherwise) into a corresponding value for α are discussed below. As indicated, the channel tracker 106 recalls at least the last best channel estimate $C_k(t-1)$ for the previous data slot (t-1), such as by storing it in a non-volatile memory region, a register or the like. In a third step 206, the channel tracker 106 uses the immediately previous best channel estimate $C_k(t-1)$ and the computed value of α from the second step 204 to predict the current best channel estimate $C_k(t)$ for the current data slot t and state k according to Equations 1 and 2 above.

The channel tracker 106 outputs this best channel estimate $C_k(t)$ for the current data slot t and state k to the matched filter 104 and to the soft decision decoder 110, as indicated in FIG. 1. As indicated earlier, the matched filter 104 uses the channel estimate $C_k(t)$, which determines the bandwidth that the matched filter $M_k$ will use. Consequently, the output of the matched filter can provide a scalar signal with enhanced SNR to the sequence estimator 108 for subsequent decoding. Further error detection and correction is then performed by the soft decision decoder 110.

The coherent demodulator 100 includes a sequence estimator 108. According to one embodiment the sequence estimator 108 can be a maximum likelihood sequence estimator (MLSE). As such, the MLSE can determine a best estimate of the transmitted data by comparing all possible transmitted code words in a data stream with the actual signal output from the matched filter 104. The codeword that is closest to the received work can be found by exhaustively checking all possible codewords, or by using a more efficient technique that gives better decoding performance. For example, in an embodiment of the invention, the sequence estimator 108 is advantageously selected to be an MLSE which implements a Viterbi algorithm. As will be appreciated by those skilled in the art, the Viterbi algorithm can greatly reduce the complexity of an MLSE. Still, the invention is not limited to an MLSE type sequence decoder or Viterbi algorithm and other sequence estimators can also be used, without limitation. Sequence estimators including MLSEs are well known in the art and therefore will not be descried here in detail.

Finally, as another level of error detection and correction, the coherent demodulator 100 can include a soft decision decoder 110. Any suitable decoder 110 may be employed, as known in the art. Generally, the soft-decision decoding block 110 will implement an algorithm by way of suitable processing hardware to decode data that has been encoded by the transmitter with an error correcting code.

As noted earlier, it has been found that there is a relationship between peak fade depth for a slot t and the Doppler shift of the received signal r(t). Knowing the Doppler shift of the signal r(t) is beneficial for channel tracking purposes. Hence, as a first step for determining α as a function of peak fade depth, one can initially obtain for a slot t the relationship between peak fade depth and Doppler shift of the signal r(t). In preferred embodiments, the relationship is determined for average peak fade depth as would be measured and reported by the peak fade depth estimator in step 202; however, it will be appreciated that other relationships between peak fade depth and Doppler shift may be investigated, such as instantaneous peak fade depth, or peak fade depth averaged over more than just two time slots. By way of example, MatLab by MathWorks, El Segunda, Calif., can be used to simulate the relationship between peak fade depth and Doppler shift of the signal r(t). An example graph of average peak fade depth versus Doppler shift for an embodiment coherent demodulator is shown in FIG. 3.

As a next step, the optimum value of α that yields a minimum BER for a particular Doppler shift can then be determined, such as by experiment or by simulation. That is, for each of a plurality of Doppler shift values, a corresponding α value is determined, either experimentally, via simulation or combinations thereof, that yields a minimum BER when used in Equations 1 and 2 above for channel tracking and coherent demodulation purposes. By way of example, optimal α as a function of Doppler shift for an embodiment coherent demodulator is shown in FIG. 4.

Figure 3:
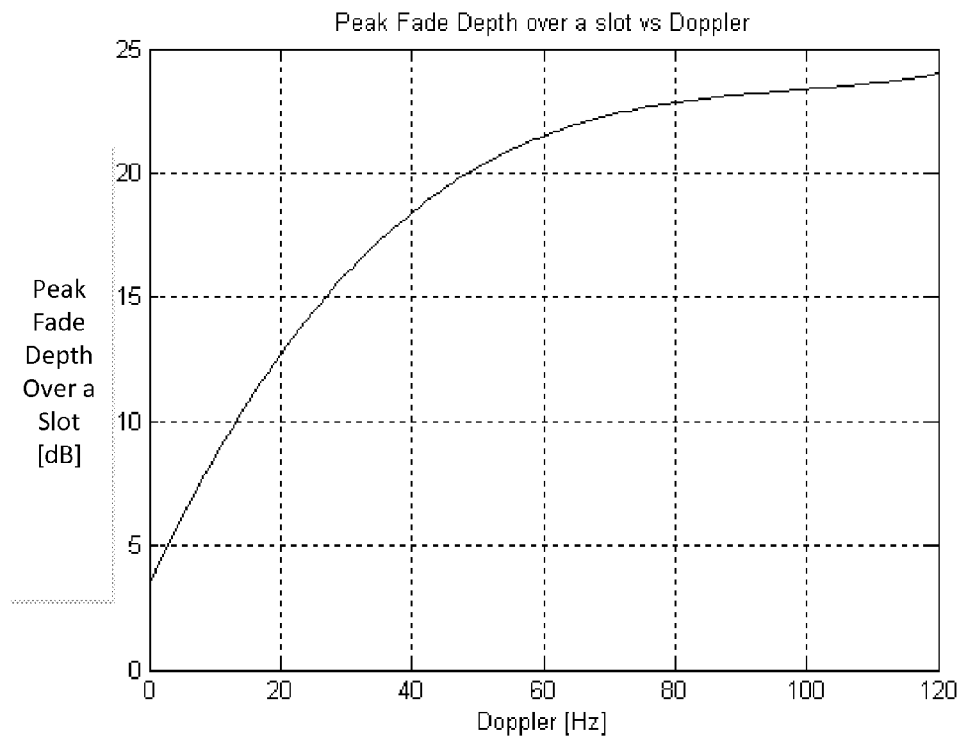
FIG. 3 is a plot which shows peak fade depth represented in dB, versus Doppler shift in Hertz.
Figure 4:
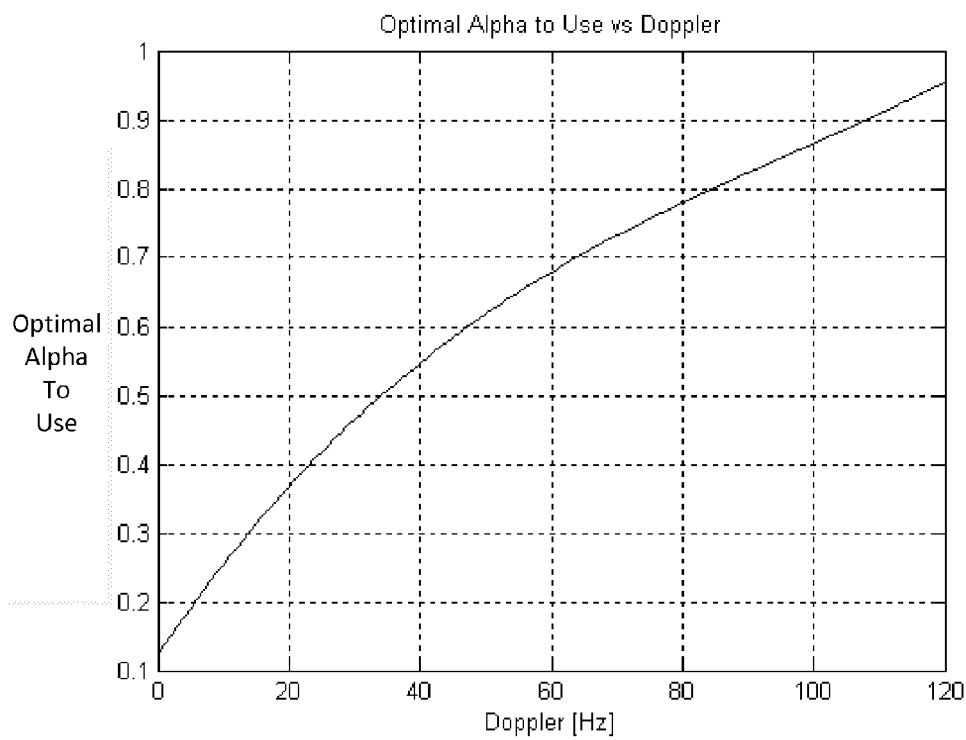
FIG. 4 is a plot which shows optimal values of the variable $\alpha$ which should be used in a channel tracker filter, versus Doppler shift in Hertz.
Figure 5:
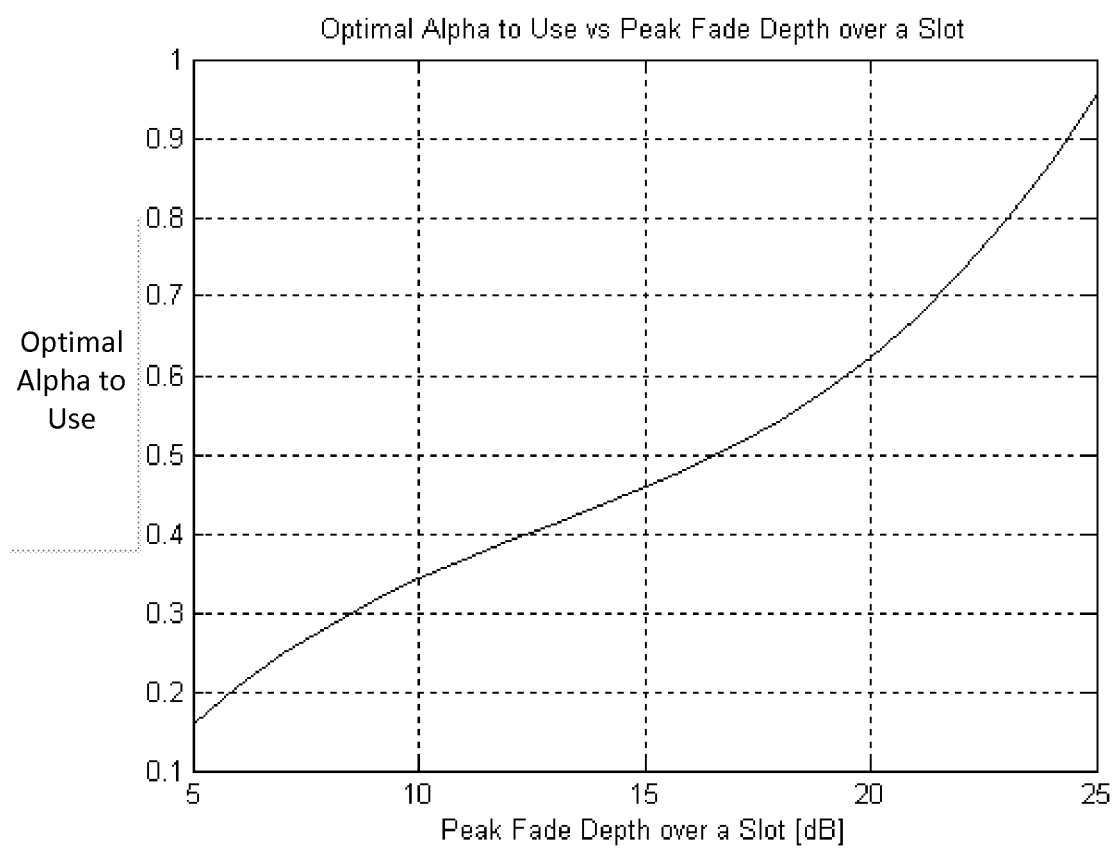
FIG. 5 is a plot which shows optimal values of the variable $\alpha$ which should be used in a channel tracker filter, versus Doppler shift in Hertz.

Finally, the data obtained from the steps above, i.e., as represented in the graphs of FIGS. 3 and 4, may be combined to generate a function that yields optimum α as a function of peak fade depth, using, for example, standard mathematical tools known in the art. A graph of optimal α as a function of average peak fade depth for an embodiment coherent demodulator is shown in FIG. 5. The data as obtained in this step may be encoded in the coherent demodulator 100, such as by way of a formula, lookup tables, combinations thereof or the like to provide a computable algorithm that converts an input peak fade depth value as generated in step 202 into a corresponding α value that yields an expected minimum BER for channel tracking and demodulation purposes.

Although the above has been discussed with specific reference to α filters, it will be appreciated that other types of filters may be used to determine the bandwidth to employ as a function of measured peak fade depth. For example, in situations in which the signal strength is known to always be high, one could do away with filters entirely and simply set the filter bandwidth directly as a function of the instantaneous peak fade depth. Conversely, filters with greater numbers of taps (i.e., using more than one previous time slot) can be employed to estimate the bandwidth as a function of the averaged peak fade depth or some other function of the instantaneous peak fade depth.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A method for adaptive channel tracking in a wireless receiver in which a matched filter bandwidth is adaptively determined for minimizing a bit error rate (BER) when demodulating a received signal which is subject to time varying amounts of Doppler shift, the method comprising:
measuring peak fade depth of said received signal over a period of time, the peak fade depth comprising a ratio of a maximum signal power and a minimum signal power;
using the peak fade depth to generate a channel estimate of a Doppler frequency shift for said received signal from which an optimal matched filter bandwidth can be determined; and
controlling a bandwidth of said matched filter based on the channel estimate to provide said optimal matched filter bandwidth.

2. The method according to claim 1 wherein measuring peak fade depth comprises measuring average peak fade depth over at least two of the periods of time.

3. The method according to claim 1, wherein said channel estimate is obtained using an $\alpha$ filter, in which $\alpha$ is a filter parameter and in which an output of said $\alpha$ filter is exclusively a function of its input and an immediately previous output of said $\alpha$ filter; and
determining a value of $\alpha$ based on the measured peak fade depth.

4. The method according to claim 3, further comprising determining a value of $\alpha$ based on the channel estimate of the Doppler frequency shift.

5. The method according to claim 3, further comprising using a non-linear equation to determine said value of $\alpha$ that yields a minimum bit error rate for the matched filter.

6. The method of claim 3 wherein the matched filter is matched to a received signal r(t) having k states according to a plurality of matched filters $M_k$ and outputs a signal given by $|r(t)-C_k(t)*M_k(t)|^2$, in which $C_k(t)$ is said channel estimate for a state k at time period t that is given by $C_k(t)=\alpha*c_k(t)+(1-\alpha)*C_k(t-1)$, $c_k(t)=M_k*r(t)/(M_k*conj(M_k))$, and $conj(M_k)$ is the complex conjugate of $M_k$.

7. The method of claim 6 wherein $\alpha$ is determined based upon an average of peak fade depth over a plurality of time periods t.

8. The method according to claim 1, wherein said period of time is one time slot of data.

9. An adaptive channel tracker for generating at least a channel estimate for a matched filter of a receiver for each data slot t, the channel tracker comprising:
a peak fade depth estimator configured to measure a peak fade depth of a received signal over at least a time period of a data slot t and output a corresponding peak fade depth estimate, where the peak fade depth comprises a ratio of a maximum signal power and a minimum signal power; and
processing circuitry configured to
generate a current channel estimate of a Doppler frequency shift for said received signal using the peak fade depth-estimate, and
provide the current channel estimate to the matched filter,
wherein said current channel estimate includes at least one value from which an optimal bandwidth of said matched filter can be determined for said data slot t.

10. The adaptive channel tracker of claim 9 wherein the processing circuitry is configured to further utilize at least one previous channel estimate and the peak fade depth estimate to generate the current channel estimate.

11. The adaptive channel tracker of claim 10 wherein the processing circuitry is configured to implement an $\alpha$ filter to generate the current channel estimate.

12. The adaptive channel tracker of claim 11 wherein the processing circuitry is configured to implement a non-linear equation to determine a current value of $\alpha$ according to the peak fade depth estimate.

13. The adaptive channel tracker of claim 12 wherein the matched filter is matched to a received signal r(t) having k states according to a plurality of matched filters $M_k$, and wherein the adaptive channel estimator is configured to output to the matched filter a plurality of current channel estimates $C_k(t)$ for each state k at time period t that are given by $C_k(t)=\alpha*c_k(t)+(1-\alpha)*C_k(t-1)$, in which $c_k(t)=M_k*r(t)/(M_k*conj(M_k))$, and $conj(M_k)$ is the complex conjugate of $M_k$.

14. The adaptive channel tracker of claim 9 wherein the peak fade depth estimator is configured to generate the peak fade depth estimate according to the average peak fade depth over at least two data slots t.

* * * * *